US012436771B2

(12) United States Patent
Krishnamurthy et al.

(10) Patent No.: US 12,436,771 B2
(45) Date of Patent: Oct. 7, 2025

(54) PERFORMING FUSED SHIFT AND LOGICAL OPERATIONS IN PROCESSOR-BASED DEVICES

(71) Applicant: QUALCOMM Incorporated, San Diego, CA (US)

(72) Inventors: Akilesh Krishnamurthy, San Jose, CA (US); Conrado Blasco, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 18/400,294

(22) Filed: Dec. 29, 2023

(65) Prior Publication Data

US 2025/0217153 A1    Jul. 3, 2025

(51) Int. Cl.
*G06F 9/38*       (2018.01)
*G06F 9/30*       (2018.01)

(52) U.S. Cl.
CPC ........ *G06F 9/3853* (2013.01); *G06F 9/30029* (2013.01); *G06F 9/30032* (2013.01)

(58) Field of Classification Search
None
See application file for complete search history.

(56) References Cited

U.S. PATENT DOCUMENTS

| 6,006,316 A | 12/1999 | Dinkjian |
| 6,061,780 A * | 5/2000 | Shippy ................. G06F 9/30018 |
| | | 712/E9.034 |
| 6,298,364 B1 | 10/2001 | Kanekura |
| 6,304,956 B1 * | 10/2001 | Tran .......................... G06F 5/01 |
| | | 712/224 |
| 8,082,430 B2 | 12/2011 | Valentine et al. |
| 2010/0118852 A1 | 5/2010 | Codrescu et al. |
| 2013/0086366 A1 | 4/2013 | Lamb |
| 2017/0003967 A1 * | 1/2017 | Lin ....................... G06F 9/3802 |
| 2017/0351519 A1 | 12/2017 | Gopal et al. |
| 2021/0073171 A1 * | 3/2021 | Master .................. G06F 7/4876 |

FOREIGN PATENT DOCUMENTS

| CN | 117170749 A | 12/2023 |
| WO | WO-9522102 A1 * | 8/1995 ........... G06F 9/3824 |

OTHER PUBLICATIONS

Pillmeier M.R., et al., "Design Alternatives for Barrel Shifters", Proceedings of SPIE—The International Society for Optical Engineering, vol. 4791, Dec. 1, 2002, 12 Pages.
International Search Report and Written Opinion for International Patent Application No. PCT/US2024/055844, mailed Feb. 26, 2025, 13 pages.

* cited by examiner

*Primary Examiner* — Eric Coleman
(74) *Attorney, Agent, or Firm* — W&T

(57) ABSTRACT

Performing fused shift and logical operations in processor-based devices is disclosed herein. In some aspects, a processor device comprises an instruction processing circuit that includes a shift/logical circuit. The instruction processing circuit is configured to detect, in an instruction stream, one or more instructions to perform a shift operation and a subsequent logical operation. In response to detecting the one or more instructions, the instruction processing circuit is further configured to use the shift/logical circuit to perform the shift operation and the logical operation in a single processor clock cycle.

22 Claims, 8 Drawing Sheets

PERFORMING FUSED SHIFT AND LOGICAL OPERATIONS IN PROCESSOR-BASED DEVICES

BACKGROUND

I. Field of the Disclosure

The technology of the disclosure relates generally to execution of instructions by a processor device, and, in particular, to efficient execution of instructions for performing shift and logical operations.

II. Background

Microprocessors, also referred to herein as "processors" or "processor devices," perform computational tasks for a wide variety of applications by executing instructions to perform mathematical and logical operations on data. For example, conventional processors may execute instructions to perform logical operations such as logical AND operations, logical OR operations, and logical exclusive-OR (XOR) operations. With logical AND operations, a bit in an output value is assigned a value of one (1) only if corresponding bits in two input values also have a value of one (1). Logical OR operations assign a value of one (1) to a bit in an output value if either corresponding bit in each of two input value also has a value of one (1). For logical XOR operations, a bit in an output value is assigned a value of one (1) only if a corresponding bit in a first input value has a value of one (1) and a corresponding bit in a second input value has a value of zero (0).

Conventional processors may also execute instructions to perform shift operations (e.g., arithmetic or logical shift left, arithmetic or logical shift right, rotate left, and rotate right operations). To support execution of shift instructions, such processors may employ barrel shifters that comprise a series of multiplexers. For an input operand having a size N in bits, barrel shifters may incur log (N) stages of gate delay, and may perform arithmetic or logical shift operations and rotate operations in a single processor clock cycle.

Because of ever-increasing demand for faster processor performance with each new generation of processor devices, it is desirable to improve the execution time of instructions that perform shift and logical operations.

SUMMARY OF THE DISCLOSURE

Aspects disclosed in the detailed description include performing fused shift and logical operations in processor-based devices. Related apparatus and methods are also disclosed. In this regard, in some exemplary aspects disclosed herein, a processor device includes an instruction processing circuit that fetches, decodes, and executes computer-executable instructions in an instruction stream. The instruction processing circuit comprises a shift/logical circuit that is configured to perform fused shift and logical operations. As used herein, a "fused shift and logical operation" refers to a shift operation and a logical operation that are performed in a single processor clock cycle, without modifying an underlying instruction set architecture (ISA) of the processor device. In exemplary operation, the instruction processing circuit detects one or more instructions to perform a shift operation and a subsequent logical operation in the instruction stream. The one or more instructions may comprise, e.g., a shift instruction and a subsequent logical instruction that is adjacent to the shift instruction in the instruction stream, or may comprise a single logical instruction with an embedded shift operation. In the former case, the instruction processing circuit in some aspects may also determine that a first destination register of the shift instruction and a second destination register of the logical instruction are the same, and further that the first destination register of the shift instruction is a source register for the logical instruction.

In response to detecting the one or more instructions, the instruction processing circuit uses the shift/logical circuit to perform the shift operation and the logical operation in a single processor clock cycle. According to some aspects in which the logical operation is an AND logical operation, the shift/logical circuit may perform the logical operation by applying a logical AND mask to a final multiplexer stage of the shift/logical circuit. In some aspects in which the logical operation is an OR or an XOR logical operation, the shift/logical circuit may perform the logical operation by applying an OR/XOR circuit following a final multiplexer stage of the shift/logical circuit.

Some aspects may provide that the shift/logical circuit comprises a barrel shifter circuit for performing a right shift operation. In such aspects, the shift/logical circuit performs the shift operation using the barrel shifter. According to some aspects, the shift/logical circuit may further comprise data reversal multiplexers for performing left shift operations. According to such aspects, the shift/logical circuit performs a left shift operation by first reversing an input value using a first data reversal multiplexer, performing a right shift operation on the input value using the barrel shifter circuit, and finally reversing a result of the right shift operation using a second data reversal multiplexer.

In another aspect, a processor device is disclosed. The processor device comprises an instruction processing circuit that includes a shift/logical circuit. The instruction processing circuit is configured to detect, in an instruction stream, one or more instructions to perform a shift operation and a subsequent logical operation. The instruction processing circuit is further configured to, responsive to detecting the one or more instructions, perform, using the shift/logical circuit, the shift operation and the logical operation in a single processor clock cycle.

In another aspect, a processor device is disclosed. The processor device comprises means for detecting, in an instruction stream, one or more instructions to perform a shift operation and a subsequent logical operation. The processor device further comprises means for performing the shift operation and the logical operation in a single processor clock cycle, responsive to detecting the one or more instructions.

In another aspect, a method for performing fused shift and logical operations in processor-based devices is disclosed. The method comprises detecting, by an instruction processing circuit of a processor device, one or more instructions to perform a shift operation and a subsequent logical operation in an instruction stream. The method further comprises, responsive to detecting the one or more instructions, performing, by a shift/logical circuit of the instruction processing circuit, the shift operation and the logical operation in a single processor clock cycle.

In another aspect, a non-transitory computer-readable medium is disclosed. The non-transitory computer-readable medium stores computer-executable instructions that, when executed, cause a processor device to detect one or more instructions to perform a shift operation and a subsequent logical operation in an instruction stream of an instruction processing circuit of the processor device. The computer-executable instructions further cause the processor device to, responsive to detecting the one or more instructions, perform, using a shift/logical circuit of the instruction processing circuit, the shift operation and the logical operation in a single processor clock cycle.

DETAILED DESCRIPTION

Figure 1:
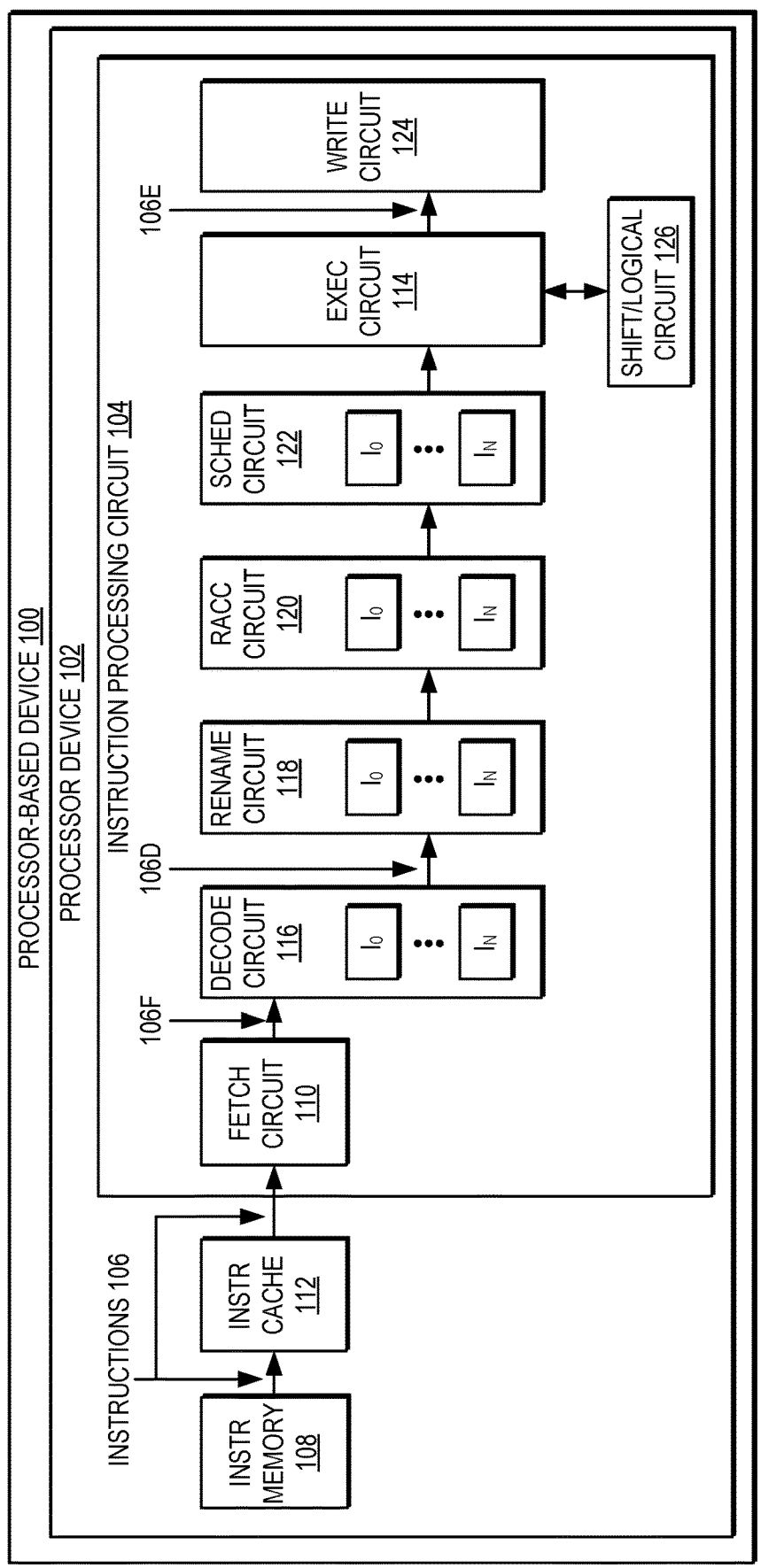
FIG. 1 is a block diagram of an exemplary processor-based device including an instruction processing circuit configured to perform fused shift and logical operations using a shift/logical circuit, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like used herein are intended to distinguish between similarly named elements, and do not indicate an ordinal relationship between such elements unless otherwise indicated.

Aspects disclosed in the detailed description include performing fused shift and logical operations in processor-based devices. Related apparatus and methods are also disclosed. In this regard, in some exemplary aspects disclosed herein, a processor device includes an instruction processing circuit that fetches, decodes, and executes computer-executable instructions in an instruction stream. The instruction processing circuit comprises a shift/logical circuit that is configured to perform fused shift and logical operations. As used herein, a "fused shift and logical operation" refers to a shift operation and a logical operation that are performed in a single processor clock cycle, without modifying an underlying instruction set architecture (ISA) of the processor device. In exemplary operation, the instruction processing circuit detects one or more instructions to perform a shift operation and a subsequent logical operation in the instruction stream. The one or more instructions may comprise, e.g., a shift instruction and a subsequent logical instruction that is adjacent to the shift instruction in the instruction stream, or may comprise a single logical instruction with an embedded shift operation. In the former case, the instruction processing circuit in some aspects may also determine that a first destination register of the shift instruction and a second destination register of the logical instruction are the same, and further that the first destination register of the shift instruction is a source register for the logical instruction.

In response to detecting the one or more instructions, the instruction processing circuit uses the shift/logical circuit to perform the shift operation and the logical operation in a single processor clock cycle. According to some aspects in which the logical operation is an AND logical operation, the shift/logical circuit may perform the logical operation by applying a logical AND mask to a final multiplexer stage of the shift/logical circuit. In some aspects in which the logical operation is an OR or an XOR logical operation, the shift/logical circuit may perform the logical operation by applying an OR/XOR circuit following a final multiplexer stage of the shift/logical circuit.

Some aspects may provide that the shift/logical circuit comprises a barrel shifter circuit for performing a right shift operation. In such aspects, the shift/logical circuit performs the shift operation using the barrel shifter. According to some aspects, the shift/logical circuit may further comprise data reversal multiplexers for performing left shift operations. According to such aspects, the shift/logical circuit performs a left shift operation by first reversing an input value using a first data reversal multiplexer, performing a right shift operation on the input value using the barrel shifter circuit, and finally reversing a result of the right shift operation using a second data reversal multiplexer.

In this regard, FIG. 1 is a diagram of an exemplary processor-based device 100 that includes a processor device 102. The processor device 102, which also may be referred to as a "processor core" or a "central processing unit (CPU) core," may be an in-order or an out-of-order processor (OoP), and/or may be one of a plurality of processor devices 102 provided by the processor-based device 100. In the example of FIG. 1, the processor device 102 includes an instruction processing circuit 104 that includes one or more instruction pipelines $I_0$-$I_N$ for processing a plurality of instructions 106 fetched from an instruction memory (captioned "INSTR MEMORY" in FIG. 1) 108 by a fetch circuit 110 for execution. The instruction memory 108 may be provided in or as part of a system memory (not shown) in the processor-based device 100, as a non-limiting example. An instruction cache (captioned "INSTR CACHE" in FIG. 1) 112 may also be provided in the processor device 102 to cache the instructions 106 fetched from the instruction memory 108 to reduce latency in the fetch circuit 110.

The fetch circuit 110 in the example of FIG. 1 is configured to provide the instructions 106 as fetched instructions 106F into the one or more instruction pipelines $I_0$-$I_N$ in the instruction processing circuit 104 to be pre-processed, before the fetched instructions 106F reach an execution circuit (captioned "EXEC CIRCUIT" in FIG. 1) 114 to be executed. The instruction pipelines $I_0$-$I_N$ are provided across different processing circuits or stages of the instruction processing circuit 104 to pre-process and process the fetched instructions 106F in a series of steps that can be performed concurrently to increase throughput prior to execution of the fetched instructions 106F by the execution circuit 114.

With continuing reference to FIG. 1, the instruction processing circuit 104 includes a decode circuit 116 configured to decode the fetched instructions 106F fetched by the fetch circuit 110 into decoded instructions 106D to determine the instruction type and actions required. The instruction type and action required encoded in the decoded instructions 106D may also be used to determine in which instruction pipeline $I_0$-$I_N$ the decoded instructions 106D should be placed. In this example, the decoded instructions 106D are placed in one or more of the instruction pipelines $I_0$-$I_N$ and are next provided to a rename circuit 118 in the instruction processing circuit 104. The rename circuit 118 is configured to determine if any register names in the decoded instructions 106D should be renamed to decouple any register dependencies that would prevent parallel or out-of-order processing.

The instruction processing circuit 104 in the processor device 102 in FIG. 1 also includes a register access circuit (captioned "RACC CIRCUIT" in FIG. 1) 120. The register access circuit 120 is configured to access a physical register in a physical register file (PRF) (not shown) based on a mapping entry mapped to a logical register in a register mapping table (RMT) (not shown) of a source register operand of a decoded instruction 106D to retrieve a produced value from an executed instruction 106E in the execution circuit 114. The register access circuit 120 is also configured to provide the retrieved produced value from an executed instruction 106E as the source register operand of a decoded instruction 106D to be executed.

Also, in the instruction processing circuit 104, a scheduler circuit (captioned "SCHED CIRCUIT" in FIG. 1) 122 is provided in the instruction pipeline $I_0$-$I_N$ and is configured to store decoded instructions 106D in reservation entries until all source register operands for the decoded instruction 106D are available. The scheduler circuit 122 issues decoded instructions 106D that are ready to be executed to the execution circuit 114. A write circuit 124 is also provided in the instruction processing circuit 104 to write back or commit produced values from executed instructions 106E to memory (such as the PRF), cache memory, or system memory.

As noted above, the processor device 102 may execute instructions for performing logical operations (such as logical AND operations, logical OR operations, and/or logical exclusive-OR (XOR) operations), and may also execute instructions for performing shift operations (e.g., arithmetic or logical shift left, arithmetic or logical shift right, rotate left, and/or rotate right operations). As the demand for faster processing performance increases with each new generation of processor devices such as the processor device 102, it may become desirable to execute instructions such as logical and shift instructions using fewer processor clock cycles.

In this regard, the instruction processing circuit 104 provides a shift/logical circuit 126 that is configured to perform fused shift and logical operations within a single processor clock cycle, without requiring any modification of an ISA on which the processor device 102 is based. In exemplary operation, the instruction processing circuit 104 detects one or more instructions to perform a shift operation and a subsequent logical operation among the instructions 106. As discussed in greater detail below with respect to FIG. 2, the one or more instructions may comprise a shift instruction and a subsequent logical instruction that is adjacent to the shift instruction, or may comprise a logical instruction with an embedded shift operation. In response to detecting the one or more instructions, the instruction processing circuit 104 uses the shift/logical circuit 126 to perform the shift operation and the logical operation in a single processor clock cycle. The shift/logical circuit 126 in some aspects may be configured to perform a right shift operation and/or a left shift operation, as discussed in greater detail below with respect to FIG. 3. Some aspects of the shift/logical circuit 126 may provide that the shift/logical circuit 126 is configured to perform a logical AND operation or a logical OR/XOR operation (i.e., either or both of an OR operation and an XOR operation), as discussed in greater detail below with respect to FIGS. 4A-4B.

Figure 2:
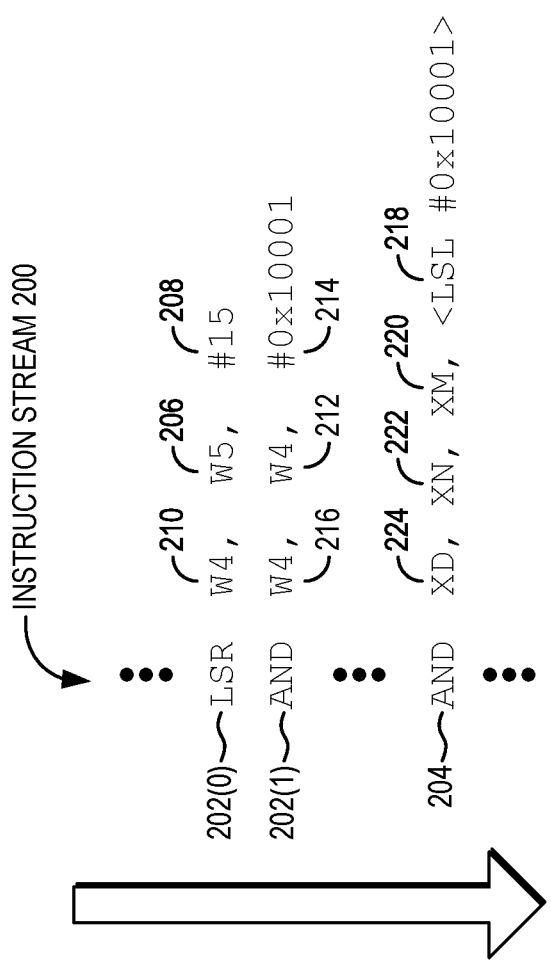
FIG. 2 is a diagram illustrating an exemplary instruction stream that may include instructions for performing shift operations and logical operations, according to some aspects.

FIG. 2 illustrates exemplary instructions for which fused shift and logical operations may be performed by the instruction processing circuit 104 and the shift/logical circuit 126 of FIG. 1 according to some aspects. In FIG. 2, an instruction stream 200 that includes a series of instructions, including a shift instruction 202(0), a logical instruction 202(1), and a logical instruction 204 are shown. The shift instruction 202(0), the logical instruction 202(1), and the logical instruction 204 may be collectively referred to herein as "instructions 202(0)-202(1), 204." The instruction stream 200 corresponds to the instructions 106 of FIG. 1, and may be fetched, decoded, and executed by the instruction processing circuit 104 as discussed above with respect to FIG. 1.

As noted above with respect to FIG. 1, the one or more instructions to perform a shift operation and a subsequent logical operation that are detected by the instruction processing circuit 104 may comprise the shift instruction 202(0) and the logical instruction 202(1) that is subsequent to and adjacent to the shift instruction 202(0) in the instruction stream 200. In the example of FIG. 2, the shift instruction 202(0) is a logical shift right (LSR) instruction that shifts a register value stored in a source register (captioned as "W5" in FIG. 2) 206 right by an immediate number 208 of bits (shifting in zeroes), and stores the result in a destination register (captioned as "W4" in FIG. 2) 210. The logical instruction 202(1) in FIG. 2 is a logical AND instruction that performs a bitwise logical AND operation on a value stored in a source register (captioned as "W4" in FIG. 2) 212 and an immediate value 214, and stores the result in a destination register (captioned as "W4" in FIG. 2) 216. It is to be understood that the shift instruction 202(0) in some aspects may comprise a shift instruction other than an LSR instruction, and the logical instruction 202(1) may comprise a logical instruction other than a logical AND instruction.

To detect and identify the shift instruction 202(0) and the logical instruction 202(1) as candidates for fused execution using the shift/logical circuit 126, the instruction processing circuit 104 first determines that the logical instruction 202(1) is subsequent to and adjacent to the shift instruction 202(0) in the instruction stream 200. The instruction processing circuit 104 further determines that the destination register 210 of the shift instruction 202(0) is the same as the destination register 216 of the logical instruction 202(1) (i.e., register W4, in the example of FIG. 2). Finally, the instruction processing circuit 104 determines in such aspects that the destination register 210 of the shift instruction 202(0) is the same as the source register 212 for the logical instruction 202(1). If all of these conditions are met, the instruction processing circuit 104 may perform fused shift and logical operations for the shift instruction 202(0) and the logical instruction 202(1) using the shift/logical circuit 126.

Some conventional ISAs allow a logical instruction to contain an embedded shift operation that is performed on the data to be used in the logical operation. Accordingly, in some aspects, the one or more instructions to perform a shift operation and a subsequent logical operation that are detected by the instruction processing circuit 104 may comprise the logical instruction 204 with an embedded shift operation. In the example of FIG. 2, the logical instruction 204 is a logical AND instruction with an embedded logical shift left (LSL) operation specified by an operand 218. When the logical instruction 204 is executed, an LSL operation is performed on data stored in a register (captioned "XM" in FIG. 2) 220, and then a logical AND operation is performed using the data stored in the register 220 and a register (captioned "XN" in FIG. 2) 222. The result is then stored in a register (captioned "XD" in FIG. 2) 224. If the instruction processing circuit 104 detects the logical instruction 204 in the instruction stream 200, the instruction processing circuit 104 may perform fused shift and logical operations for the logical instruction 204 using the shift/logical circuit 126. It is to be understood that, in some aspects, the logical instruction 204 may comprise a logical instruction other than a logical AND instruction.

Figure 3:
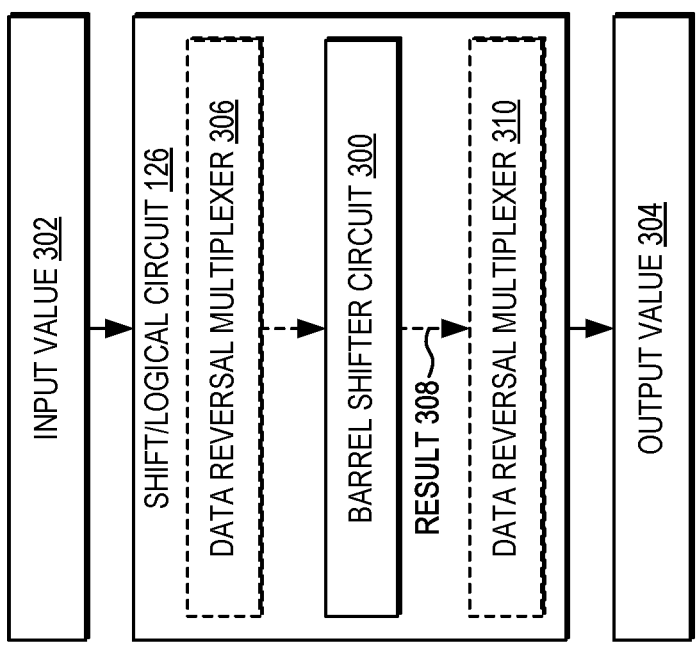
FIG. 3 is a block diagram illustrating elements of the shift/logical circuit of FIG. 1 for performing shift operations, according to some aspects.

To illustrate exemplary elements of the shift/logical circuit 126 of FIG. 1 for performing shift operations according to some aspects, FIG. 3 is provided. In the example of FIG. 3, the shift/logical circuit 126 comprises a barrel shifter circuit 300 that is configured to perform right shift operations. The barrel shifter circuit 300 in some aspects may comprise a sequence of multiplexers (not shown), wherein the output of a first multiplexer provides the input for a next multiplexer to shift the bits of an input value 302 by a specified number of bits to obtain an output value 304. In some aspects, the shift/logical circuit 126 may be configured to perform left shift operations. In such aspects, the shift/logical circuit 126 further comprises a data reversal multiplexer 306 that is configured to reverse the bits of the input value 302 before the barrel shifter circuit 300 performs the right shift operation. The shift/logical circuit 126 then reverses a result 308 of the right shift operation using a data reversal multiplexer 310 to obtain the output value 304.

Figure 4A:
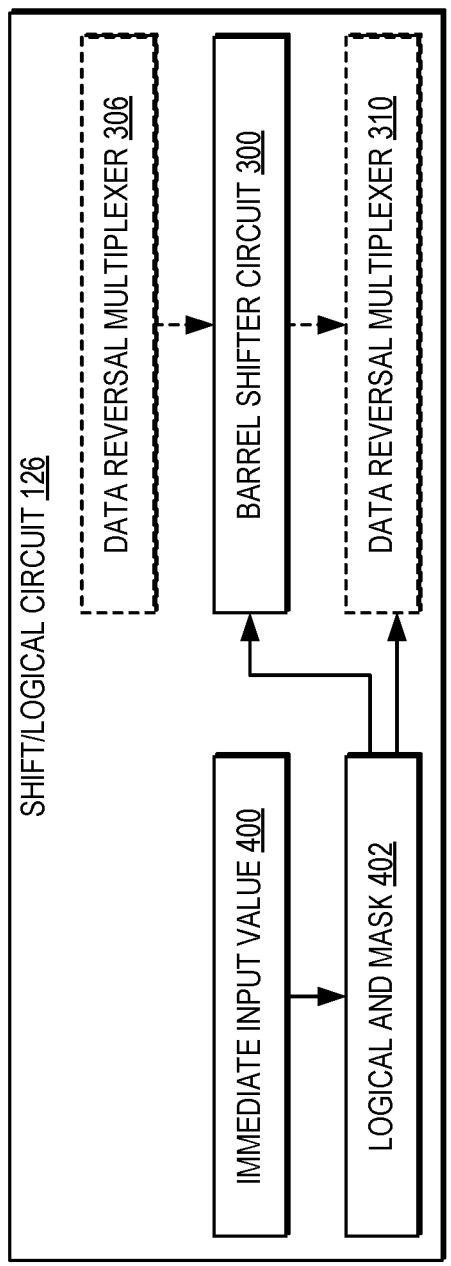
FIGS. 4A and 4B are block diagrams illustrating elements of the shift/logical circuit of FIG. 1 for performing logical operations, according to some aspects.
Figure 4B:
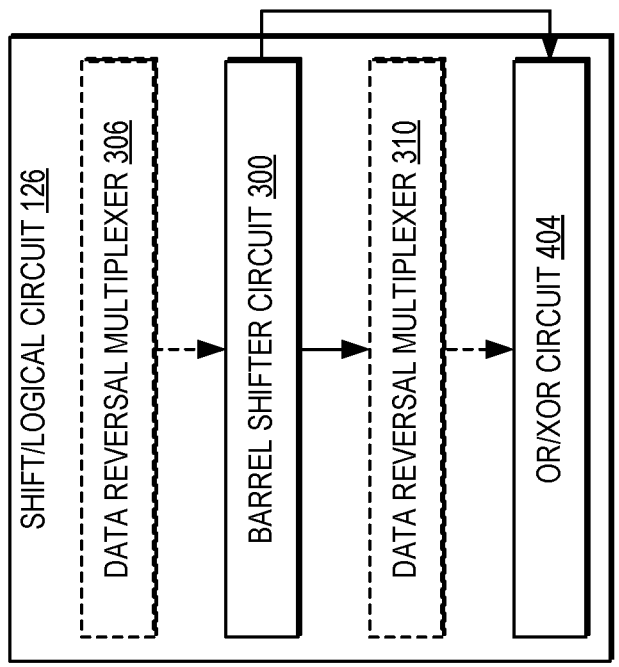

FIGS. 4A and 4B are block diagrams illustrating exemplary elements of the shift/logical circuit 126 of FIGS. 1 and 3 for performing logical AND operations and logical OR/XOR operations, respectively, according to some aspects. In FIG. 4A, the shift/logical circuit 126 is configured to perform a logical AND operation by using an immediate input value 400 (e.g., the immediate number 208 of FIG. 2) to apply a logical AND mask 402 to a final multiplexer state of the shift/logical circuit 126. Thus, for example, in aspects in which the shift/logical circuit is configured to perform left shift operations using the data reversal multiplexer 310, the shift/logical circuit 126 applies the logical AND mask 402 to the data reversal multiplexer 310. Aspects in which the shift/logical circuit 126 use the barrel shifter circuit 300 alone to perform right shift operations may provide that the logical AND mask 402 is applied to a multiplexer (not shown) of the barrel shifter circuit 300.

FIG. 4B illustrates an aspect in which the shift/logical circuit 126 is configured to perform a logical OR/XOR operation (i.e., one or both of a logical OR operation and a logical XOR operation). As seen in FIG. 4B, the shift/logical circuit 126 in such aspects applies an OR/XOR circuit 404 following a final multiplexer stage of the shift/logical circuit 126. Accordingly, aspects in which the shift/logical circuit 126 is configured to perform left shift operations using the data reversal multiplexer 310 may provide that the shift/logical circuit 126 applies the OR/XOR circuit 404 following the data reversal multiplexer 310. In aspects in which the shift/logical circuit 126 uses the barrel shifter circuit 300 alone to perform right shift operations, the OR/XOR circuit 404 may be applied following a multiplexer (not shown) of the barrel shifter circuit 300.

Figure 5A:
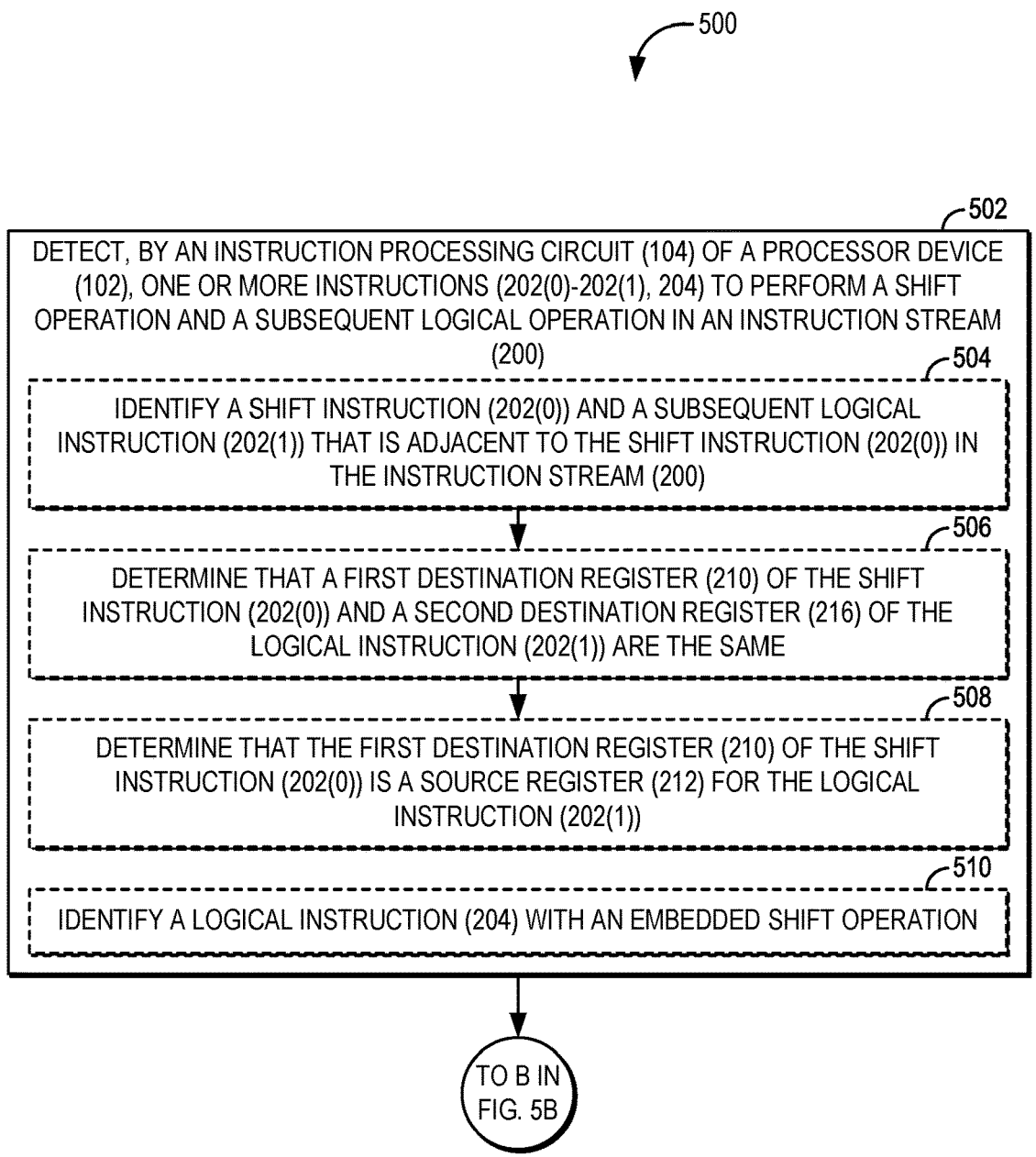
FIGS. 5A and 5B provide a flowchart illustrating exemplary operations of the instruction processing circuit of FIG. 1 for performing fused shift and logical operations, according to some aspects.
Figure 5B:
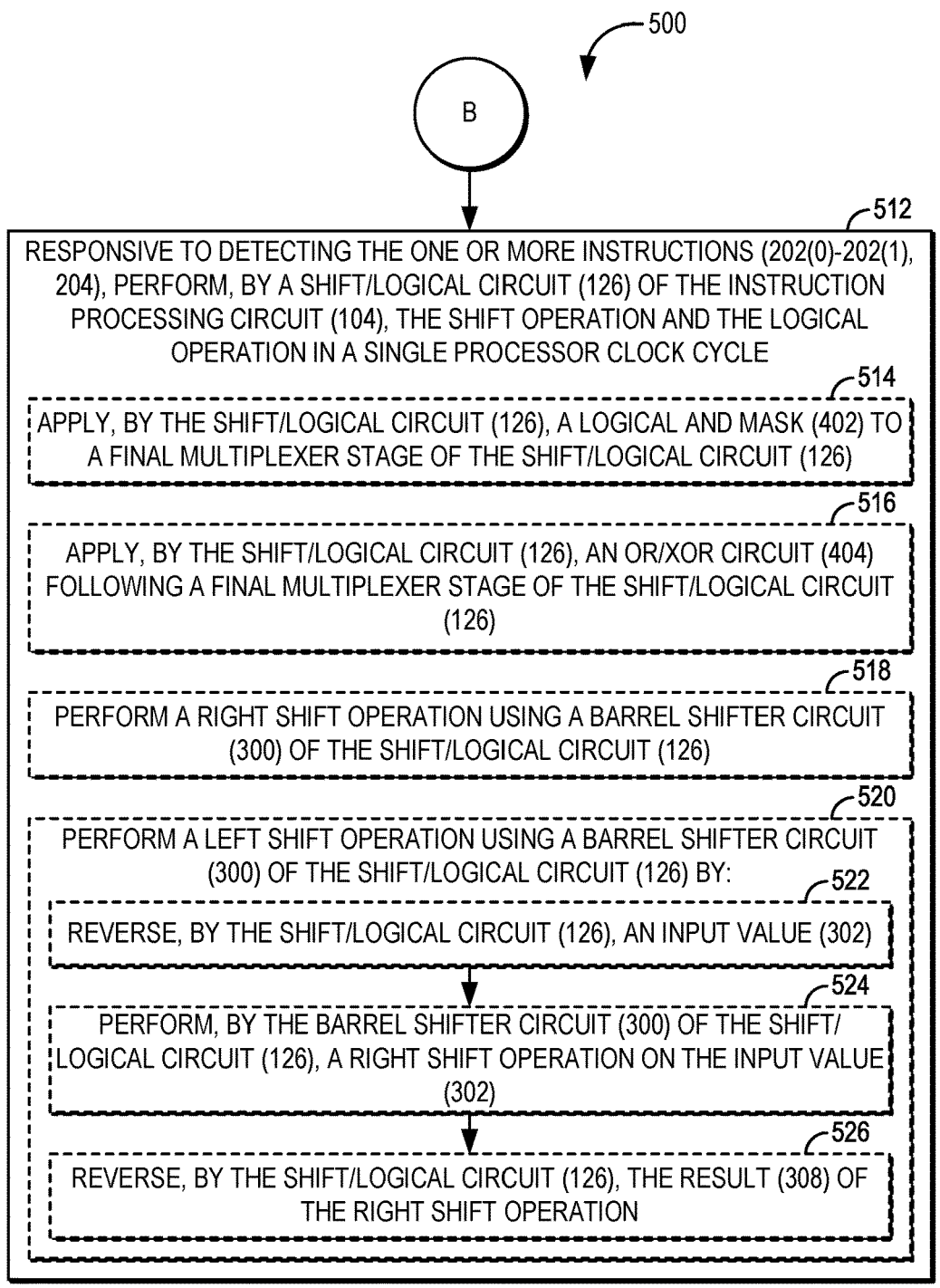

To illustrate operations performed by the instruction processing circuit 104 of FIG. 1 for performing fused shift and logical operations according to some aspects, FIGS. 5A and 5B provide a flowchart showing exemplary operations 500. For the sake of clarity, elements of FIGS. 1-3, and 4A-4B are referenced in describing FIGS. 5A and 5B. It is to be understood that some aspects may provide that some operations illustrated in FIGS. 5A and 5B may be performed in an order other than that illustrated herein, and/or may be omitted.

The exemplary operations 500 begin in FIG. 5A with an instruction processing circuit of a processor device (e.g., the instruction processing circuit 104 of the processor device 102 of FIG. 1) detecting one or more instructions (such as the instructions 202(0)-202(1), 204 of FIG. 2) to perform a shift operation and a subsequent logical operation in an instruction stream (such as the instruction stream 200 of FIG. 2) (block 502). In some aspects, the operations of block 502 for detecting the one or more instructions 202(0)-202(1), 204 may comprise first identifying a shift instruction (e.g., the shift instruction 202(0) of FIG. 2) and a subsequent logical instruction (such as the logical instruction 202(1) of FIG. 2) that is adjacent to the shift instruction 202(0) in the instruction stream 200 (block 504). The instruction processing circuit 104 in some such aspects may also determine that a first destination register (e.g., the destination register 210 of FIG. 2) of the shift instruction 202(0) and a second destination register (such as the destination register 216 of FIG. 2) of the logical instruction 202(1) are the same (block 506). The instruction processing circuit 104 further determines in such aspects that the first destination register 210 of the shift instruction 202(0) is a source register (e.g., the source register 212 of FIG. 2) for the logical instruction 202(1) (block 508). Some aspects may provide that the operations of block 502 for detecting the one or more instructions 202(0)-202(1), 204 may comprise identifying a logical instruction (such as the logical instruction 204 of FIG. 2) with an embedded shift operation (block 510). The exemplary operations 500 then continue at block 512 of FIG. 5B.

Referring now to FIG. 5B, the instruction processing circuit 104, in response to detecting the one or more instructions 202(0)-202(1), 204, uses a shift/logical circuit (such as the shift/logical circuit 126 of FIGS. 1, 3, and 4A-4B) to perform the shift operation and the logical operation in a single processor clock cycle (block 512). According to some aspects in which the logical operation is an AND logical operation, the operations of block 512 for performing the logical operation may comprise the shift/logical circuit 126 applying a logical AND mask (e.g., the logical AND mask 402 of FIG. 4A) to a final multiplexer stage (such as a multiplexer (not shown) of the barrel shifter circuit 300 of FIGS. 3 and 4A, or the data reversal multiplexer 310 of FIGS. 3 and 4A) of the shift/logical circuit 126 (block 514). In some aspects in which the logical operation is an OR/XOR logical operation, the operations of block 512 for performing the logical operation may comprise the shift/logical circuit 126 applying an OR/XOR circuit (e.g., the OR/XOR circuit 404 of FIG. 4B) following a final multiplexer stage (such as a multiplexer (not shown) of the barrel shifter circuit 300 of FIGS. 3 and 4B, or the data reversal multiplexer 310 of FIGS. 3 and 4B) of the shift/logical circuit 126 (block 516).

Some aspects in which the shift operation is a right shift operation may provide that the operations of block 512 for performing the shift operation may comprise the shift/logical circuit 126 performing a right shift operation using a barrel shifter circuit (such as the barrel shifter circuit 300 of FIGS. 3 and 4A-4B) of the shift/logical circuit 126 (block 518). According to some aspects in which the shift operation is a left shift operation, the operations of block 512 for performing the shift operation may comprise the shift/logical circuit 126 performing a left shift operation using the barrel shifter circuit 300 by performing a series of operations (block 520). The shift/logical circuit 126 first reverses an input value (e.g., the input value 302 of FIG. 3) using, for example, a data reversal multiplexer such as the data reversal multiplexer 306 of FIGS. 3 and 4A-4B (block 522). The shift/logical circuit 126 next performs a right shift operation on the input value 302 using the barrel shifter circuit 300 (block 524). Finally, the shift/logical circuit 126 reverses a result of the right shift operation (e.g., the result 308 of FIG. 3) using, for example, a data reversal multiplexer such as the data reversal multiplexer 310 of FIGS. 3 and 4A-4B (block 526).

The instruction processing circuit according to aspects disclosed herein and discussed with reference to FIGS. 1, 2, and 5A and 5B may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
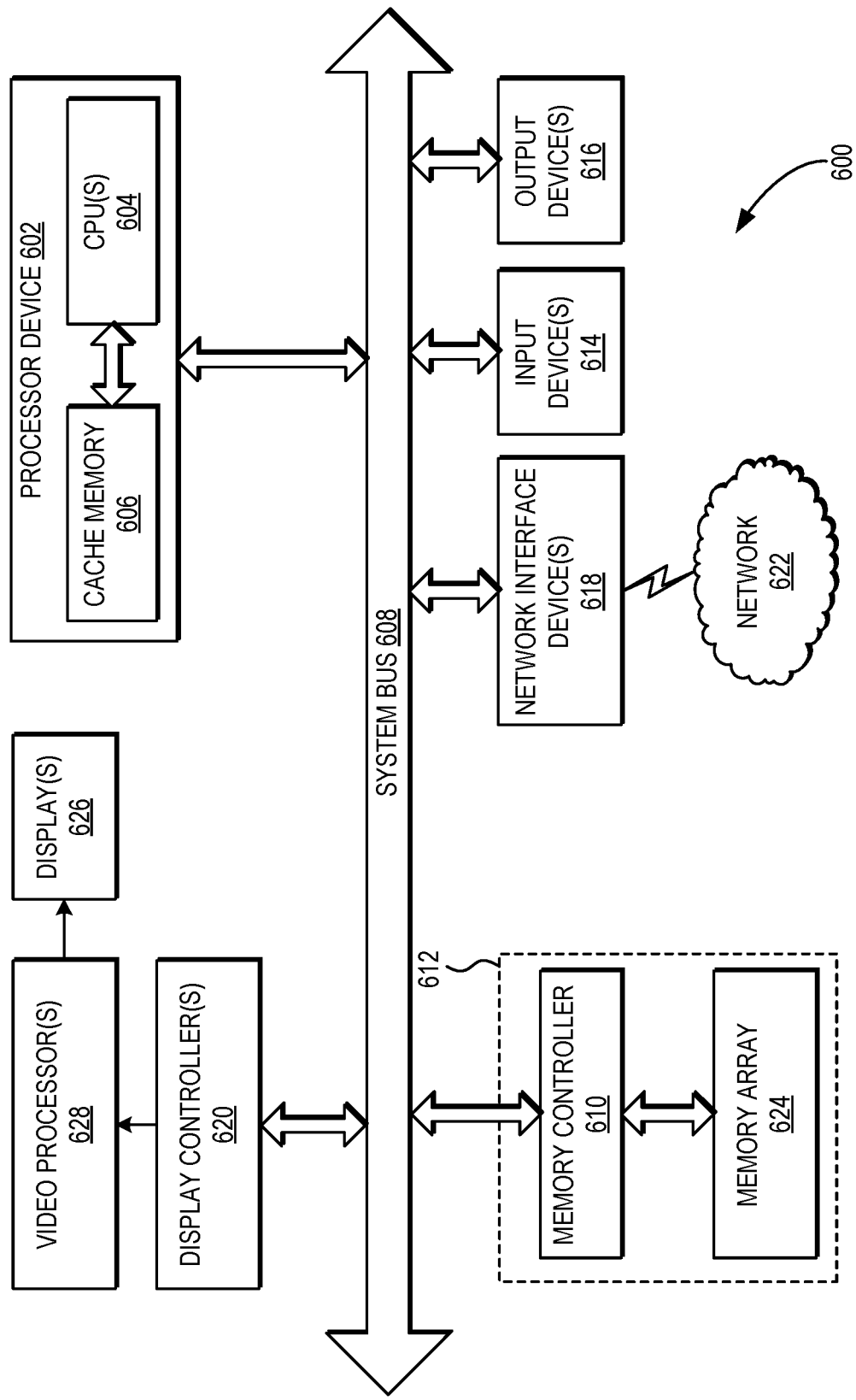
FIG. 6 is a block diagram of an exemplary processor-based device that can include the instruction processing circuit of FIG. 1.

In this regard, FIG. 6 illustrates an example of a processor-based device 600, which corresponds in functionality to the processor-based device 100 of FIG. 1. The processor-based device 600 includes a processor device 602 which comprises one or more CPUs 604 coupled to a cache memory 606. The CPU(s) 604 is also coupled to a system bus 608 and can intercouple devices included in the processor-based device 600. As is well known, the CPU(s) 604 communicates with these other devices by exchanging address, control, and data information over the system bus 608. For example, the CPU(s) 604 can communicate bus transaction requests to a memory controller 610. Although not illustrated in FIG. 6, multiple system buses 608 could be provided, wherein each system bus 608 constitutes a different fabric.

Other devices may be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include the memory controller 610 coupled to one or more memory arrays 624.

The CPU(s) 604 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor device. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor device, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor device may be a microprocessor, but in the alternative, the processor device may be any conventional processor device, controller, microcontroller, or state machine. A processor device may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor device such that the processor device can read information from, and write information to, the storage medium. In the alternative, the storage medium may be integral to the processor device. The processor device and the storage medium may reside in an ASIC. The ASIC may reside in a remote station. In the alternative, the processor device and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor device, comprising:
   an instruction processing circuit comprising a shift/logical circuit; and
   the instruction processing circuit configured to:
      detect, in an instruction stream, one or more instructions to perform a shift operation and a subsequent logical operation; and
      responsive to detecting the one or more instructions, perform, using the shift/logical circuit, the shift operation and the logical operation in a single processor clock cycle.
2. The processor device of clause 1, wherein the instruction processing circuit is configured to detect the one or more instructions by being configured to identify a shift instruction and a subsequent logical instruction that is adjacent to the shift instruction in the instruction stream.
3. The processor device of any one of clauses 1-2, wherein the instruction processing circuit is configured to detect the one or more instructions by being configured to:
   determine that a first destination register of the shift instruction and a second destination register of the logical instruction are the same; and
   determine that the first destination register of the shift instruction is a source register for the logical instruction.
4. The processor device of clause 1, wherein the instruction processing circuit is configured to detect the one or more instructions by being configured to identify a logical instruction with an embedded shift operation.
5. The processor device of any one of clauses 1-4, wherein the instruction processing circuit is configured to perform the shift operation and the logical operation in a single processor cycle by being configured to apply, using the shift/logical circuit, a logical AND mask to a final multiplexer stage of the shift/logical circuit.
6. The processor device of any one of clauses 1-5, wherein the instruction processing circuit is configured to perform the shift operation and the logical operation in a single processor cycle by being configured to apply, using the shift/logical circuit, an OR/XOR circuit following a final multiplexer stage of the shift/logical circuit.
7. The processor device of any one of clauses 1-6, wherein the instruction processing circuit is configured to perform the shift operation by being configured to perform a right shift operation using a barrel shifter circuit of the shift/logical circuit.
8. The processor device of any one of clauses 1-6, wherein:
   the instruction processing circuit is configured to perform the shift operation by being configured to perform a left shift operation using a barrel shifter circuit of the shift/logical circuit; and
   the instruction processing circuit is configured to perform the left shift operation by being configured to:
      reverse, using the shift/logical circuit, an input value;
      perform, using the barrel shifter circuit of the shift/logical circuit, a right shift operation on the input value; and
      reverse, using the shift/logical circuit, the result of the right shift operation.
9. The processor device of any one of clauses 1-8, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.
10. A processor device, comprising:
    means for detecting, in an instruction stream, one or more instructions to perform a shift operation and a subsequent logical operation; and
    means for performing the shift operation and the logical operation in a single processor clock cycle, responsive to detecting the one or more instructions.
11. A method for performing fused shift and logical operations, comprising:
    detecting, by an instruction processing circuit of a processor device, one or more instructions to perform a shift operation and a subsequent logical operation in an instruction stream; and
    responsive to detecting the one or more instructions, performing, by a shift/logical circuit of the instruction processing circuit, the shift operation and the logical operation in a single processor clock cycle.
12. The method of clause 11, wherein detecting the one or more instructions comprises identifying a shift instruction and a subsequent logical instruction that is adjacent to the shift instruction in the instruction stream.
13. The method of any one of clauses 11-12, wherein detecting the one or more instructions comprises:
    determining that a first destination register of the shift instruction and a second destination register of the logical instruction are the same; and determining that the first destination register of the shift instruction is a source register for the logical instruction.

14. The method of clause 11, wherein detecting the one or more instructions comprises identifying a logical instruction with an embedded shift operation.

15. The method of any one of clauses 11-14, wherein performing the shift operation and the logical operation in a single processor cycle comprises applying, by the shift/logical circuit, a logical AND mask to a final multiplexer stage of the shift/logical circuit.

16. The method of any one of clauses 11-15, wherein performing the shift operation and the logical operation in a single processor cycle comprises applying, by the shift/logical circuit, an OR/XOR circuit following a final multiplexer stage of the shift/logical circuit.

17. The method of any one of clauses 11-16, wherein performing the shift operation comprises performing a right shift operation using a barrel shifter circuit of the shift/logical circuit.

18. The method of any one of clauses 11-16, wherein performing the shift operation comprises performing a left shift operation using a barrel shifter circuit of the shift/logical circuit by:
reversing, by the shift/logical circuit, an input value;
performing, by the barrel shifter circuit of the shift/logical circuit, a right shift operation on the input value; and
reversing, by the shift/logical circuit, the result of the right shift operation.

19. A non-transitory computer-readable medium, having stored thereon computer-executable instructions that, when executed, cause a processor device to:
detect one or more instructions to perform a shift operation and a subsequent logical operation in an instruction stream of an instruction processing circuit of the processor device; and
responsive to detecting the one or more instructions, perform, using a shift/logical circuit of the instruction processing circuit, the shift operation and the logical operation in a single processor clock cycle.

20. The non-transitory computer-readable medium of clause 19, wherein the computer-executable instructions cause the processor device to detect the one or more instructions by causing the processor device to identify a shift instruction and a subsequent logical instruction that is adjacent to the shift instruction in the instruction stream.

21. The non-transitory computer-readable medium of any one of clauses 19-20, wherein the computer-executable instructions cause the processor device to detect the one or more instructions by causing the processor device to:
determine that a first destination register of the shift instruction and a second destination register of the logical instruction are the same; and
determine that the first destination register of the shift instruction is a source register for the logical instruction.

22. The non-transitory computer-readable medium of clause 19, wherein the computer-executable instructions cause the processor device to detect the one or more instructions by causing the processor device to identify a logical instruction with an embedded shift operation.

What is claimed is:
1. A processor device, comprising:
an instruction processing circuit comprising a shift/logical circuit; and
the instruction processing circuit configured to:
detect, in an instruction stream, one or more instructions to perform a shift operation and a subsequent bitwise logical operation; and
responsive to detecting the one or more instructions, perform, using the shift/logical circuit, the shift operation and the bitwise logical operation in a single processor clock cycle.

2. The processor device of claim 1, wherein the instruction processing circuit is configured to detect the one or more instructions by being configured to identify a shift instruction and a subsequent bitwise logical instruction that is adjacent to the shift instruction in the instruction stream.

3. The processor device of claim 2, wherein the instruction processing circuit is configured to detect the one or more instructions by being configured to:
determine that a first destination register of the shift instruction and a second destination register of the bitwise logical instruction are the same; and
determine that the first destination register of the shift instruction is a source register for the bitwise logical instruction.

4. The processor device of claim 1, wherein the instruction processing circuit is configured to detect the one or more instructions by being configured to identify a bitwise logical instruction with an embedded shift operation.

5. The processor device of claim 1, wherein the instruction processing circuit is configured to perform the shift operation and the bitwise logical operation in a single processor cycle by being configured to apply, using the shift/logical circuit, a logical AND mask to a final multiplexer stage of the shift/logical circuit.

6. The processor device of claim 1, wherein the instruction processing circuit is configured to perform the shift operation and the bitwise logical operation in a single processor cycle by being configured to apply, using the shift/logical circuit, an OR/XOR circuit following a final multiplexer stage of the shift/logical circuit.

7. The processor device of claim 1, wherein the instruction processing circuit is configured to perform the shift operation by being configured to perform a right shift operation using a barrel shifter circuit of the shift/logical circuit.

8. The processor device of claim 1, wherein:
the instruction processing circuit is configured to perform the shift operation by being configured to perform a left shift operation using a barrel shifter circuit of the shift/logical circuit; and
the instruction processing circuit is configured to perform the left shift operation by being configured to:
reverse, using the shift/logical circuit, an input value;
perform, using the barrel shifter circuit of the shift/logical circuit, a right shift operation on the input value; and
reverse, using the shift/logical circuit, the result of the right shift operation.

9. The processor device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server;

a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A processor device, comprising:
means for detecting, in an instruction stream, one or more instructions to perform a shift operation and a subsequent bitwise logical operation; and
means for performing the shift operation and the bitwise logical operation in a single processor clock cycle, responsive to detecting the one or more instructions.

11. A method for performing fused shift and bitwise logical operations, comprising:
detecting, by an instruction processing circuit of a processor device, one or more instructions to perform a shift operation and a subsequent bitwise logical operation in an instruction stream; and
responsive to detecting the one or more instructions, performing, by a shift/logical circuit of the instruction processing circuit, the shift operation and the bitwise logical operation in a single processor clock cycle.

12. The method of claim 11, wherein detecting the one or more instructions comprises identifying a shift instruction and a subsequent bitwise logical instruction that is adjacent to the shift instruction in the instruction stream.

13. The method of claim 12, wherein detecting the one or more instructions comprises:
determining that a first destination register of the shift instruction and a second destination register of the bitwise logical instruction are the same; and
determining that the first destination register of the shift instruction is a source register for the bitwise logical instruction.

14. The method of claim 11, wherein detecting the one or more instructions comprises identifying a bitwise logical instruction with an embedded shift operation.

15. The method of claim 11, wherein performing the shift operation and the bitwise logical operation in a single processor cycle comprises applying, by the shift/logical circuit, a logical AND mask to a final multiplexer stage of the shift/logical circuit.

16. The method of claim 11, wherein performing the shift operation and the bitwise logical operation in a single processor cycle comprises applying, by the shift/logical circuit, an OR/XOR circuit following a final multiplexer stage of the shift/logical circuit.

17. The method of claim 11, wherein performing the shift operation comprises performing a right shift operation using a barrel shifter circuit of the shift/logical circuit.

18. The method of claim 11, wherein performing the shift operation comprises performing a left shift operation using a barrel shifter circuit of the shift/logical circuit by:
reversing, by the shift/logical circuit, an input value;
performing, by the barrel shifter circuit of the shift/logical circuit, a right shift operation on the input value; and
reversing, by the shift/logical circuit, the result of the right shift operation.

19. A non-transitory computer-readable medium, having stored thereon computer-executable instructions that, when executed, cause a processor device to:
detect one or more instructions to perform a shift operation and a subsequent bitwise logical operation in an instruction stream of an instruction processing circuit of the processor device; and
responsive to detecting the one or more instructions, perform, using a shift/logical circuit of the instruction processing circuit, the shift operation and the bitwise logical operation in a single processor clock cycle.

20. The non-transitory computer-readable medium of claim 19, wherein the computer-executable instructions cause the processor device to detect the one or more instructions by causing the processor device to identify a shift instruction and a subsequent bitwise logical instruction that is adjacent to the shift instruction in the instruction stream.

21. The non-transitory computer-readable medium of claim 20, wherein the computer-executable instructions cause the processor device to detect the one or more instructions by causing the processor device to:
determine that a first destination register of the shift instruction and a second destination register of the bitwise logical instruction are the same; and
determine that the first destination register of the shift instruction is a source register for the bitwise logical instruction.

22. The non-transitory computer-readable medium of claim 19, wherein the computer-executable instructions cause the processor device to detect the one or more instructions by causing the processor device to identify a bitwise logical instruction with an embedded shift operation.

* * * * *